(12) United States Patent
Lin et al.

(10) Patent No.: US 7,532,489 B2
(45) Date of Patent: May 12, 2009

(54) POWER FACTOR CORRECTION POWER SUPPLY

(76) Inventors: Fuyong Lin, No. 604, #22, Xinnan District, Huaqiao University, Quanzhou (CN) 362021; Fuxiang Lin, Gongqu 17#101, Fujian Agriculture and Forestry University, Fuzhou (CN) 350008

( * ) Notice: Subject to any disclaimer, the term of this patent is extended or adjusted under 35 U.S.C. 154(b) by 132 days.

(21) Appl. No.: 11/779,934

(22) Filed: Jul. 19, 2007

(65) Prior Publication Data

US 2007/0263417 A1 Nov. 15, 2007

Related U.S. Application Data

(63) Continuation-in-part of application No. PCT/CN2005/001570, filed on Sep. 26, 2005.

(30) Foreign Application Priority Data

Jan. 19, 2005 (CN) .................. 2005 1 0006520
Jun. 30, 2005 (CN) .................. 2004 1 0080821

(51) Int. Cl.
*H02M 3/335* (2006.01)
*H02M 7/537* (2006.01)

(52) U.S. Cl. ................. 363/21.04; 363/21.08

(58) Field of Classification Search ............. 363/15, 363/16, 20, 21.01, 21.04, 21.08, 21.1, 21.11, 363/21.12, 21.16, 21.17, 21.18, 95, 97, 131
See application file for complete search history.

(56) References Cited

U.S. PATENT DOCUMENTS

| | | | | |
|---|---|---|---|---|
| 5,600,546 A * | 2/1997 | Ho et al. | ............ | 363/21.18 |
| 5,712,780 A * | 1/1998 | Youn et al. | ............ | 363/131 |
| 5,986,898 A * | 11/1999 | Meitzner et al. | ........ | 363/21.04 |
| 6,636,430 B1 * | 10/2003 | Batarseh et al. | ......... | 363/21.01 |
| 6,717,827 B2 * | 4/2004 | Ota | ............ | 363/21.12 |
| 7,254,045 B2 * | 8/2007 | Imamura | ........... | 363/21.1 |

* cited by examiner

*Primary Examiner*—Gary L Laxton
(74) *Attorney, Agent, or Firm*—Matthias Scholl P.C.; Matthias Scholl

(57) ABSTRACT

Provided herein is a power factor correction (PFC) power supply, comprising: a bridge rectifier having an input and an output, a filter capacitor connected to the output of the bridge rectifier, a transformer having a primary winding, a fly-back winding and a secondary winding, a forward diode, a fly-back diode, a storage capacitor circuit having a valley-fill circuit and a capacitor connected in parallel, and a switch connected between the primary winding and the output of the bridge rectifier. The PFC power supply features improved efficiency and low switching loss.

15 Claims, 2 Drawing Sheets

POWER FACTOR CORRECTION POWER SUPPLY

CROSS-REFERENCE TO RELATED APPLICATIONS

This application is a continuation-in-part of International Patent Application No. PCT/CN2005/001570 with an international filing date of Sep. 26, 2005, designating the United States, now pending, and further claims priority benefits to Chinese Patent Application No. 200510006520.4 filed Jan. 19, 2005 and Chinese Patent Application No. 200410080821.1 filed on Jun. 30, 2005. The contents of all of these specifications are incorporated herein by reference.

BACKGROUND OF THE INVENTION

1. Field of the Invention

This invention relates to a power supply, and particularly to a power factor correction power supply.

2. Description of the Related Art

Conventionally, two-stage converters are widely used to limit harmonics of line currents of electronic equipments to certain levels. A first stage is a power factor correction (PFC) stage comprising an inductor, a rectifier and a transistor, and the transistor is driven by a PFC signal from the PFC stage. A second stage comprises a transistor controlled by a PWM signal, a transformer and a secondary circuitry. By way of the two-stage structure, an output voltage is regulated and output noise is reduced.

However, the PFC stage increases the cost and the number of devices of the power supply, and therefore the efficiency of the power supply is reduced. Other approaches in the art use single stage converters integrating functions of power factor correction and isolated DC/DC conversion into a single stage. Unfortunately, a common problem with these approaches is an inherent low efficiency due to a fact that energy is processed twice during an energy transferring process, which causes an extremely high switching loss.

SUMMARY OF THE INVENTION

In view of the above-described problem, it is one objective of the invention to provide a PFC power supply with improved efficiency and low switching loss.

To achieve the above objectives, in accordance with one aspect of the present invention, there is provided a power factor correction (PFC) power supply, comprising: a bridge rectifier having an input and an output, a filter capacitor connected to the output of the bridge rectifier, a transformer having a primary winding, a fly-back winding and a secondary winding, a forward diode, a fly-back diode, a storage capacitor circuit having a valley-fill circuit and a capacitor connected in parallel, and a switch connected between the primary winding and the output of the bridge rectifier; wherein an anode of the forward diode is connected to a positive output of the bridge rectifier, and a cathode thereof is connected to a first end of the storage capacitor circuit and the primary winding; an anode of the fly-back diode is connected to the positive output of the bridge rectifier, and a cathode thereof is connected to a first end of the fly-back winding; a second end of the fly-back winding is connected to the first end of the storage capacitor circuit and the primary winding; a first end of the storage capacitor circuit is connected to the first end of the primary winding, and a second end thereof is connected to a negative output of the bridge rectifier; and a first end of the switch is connected to the second end of the primary winding, and a second end thereof is connected to the negative output of the bridge rectifier.

In certain classes of this embodiment, the valley-fill capacitor circuit comprises a first capacitor, a second capacitor, a first diode, a second diode and a third diode.

In certain classes of this embodiment, the first diode has an anode being connected to a negative end of the first capacitor and a cathode being coupled to a positive end of the second capacitor; the second diode has an anode being connected to the positive end of the second capacitor and a cathode being coupled to a positive end of the first capacitor; and the third diode has an anode being connected to a negative end of the second capacitor, and a cathode being coupled to the negative end of the first capacitor.

In certain classes of this embodiment, the transformer is a forward transformer or a fly-back transformer.

In certain classes of this embodiment, the transformer transfers energy to the secondary circuit via the secondary winding and stores energy as the transformer is the forward transformer and the switch is turned on; the fly-back winding and the bridge rectifier recharges for the storage capacitor circuit via the fly-back diode as the transformer is the forward transformer and the switch is turned off; the transformer stores energy as the transformer is the fly-back transformer and the switch is turned on; and the fly-back winding and the bridge rectifier recharges for the storage capacitor circuit via the fly-back diode as the transformer is the fly-back transformer and the switch is turned off.

In accordance with another aspect of the present invention, there is provided a power factor correction (PFC) power supply, comprising: a bridge rectifier having an input and an output, a filter capacitor connected to the output of the bridge rectifier, a transformer having a primary winding, a fly-back winding and a secondary winding, a first fly-back diode, a second fly-back diode, a storage capacitor circuit having a valley-fill circuit and a capacitor connected in parallel, and a switch connected between the primary winding and the output of the bridge rectifier; wherein an anode of each of the first fly-back diode and the second fly-back diode is connected to a positive output of the bridge rectifier, and a cathode thereof is connected to a first end of the storage capacitor circuit and the primary winding; a second end of the fly-back winding is connected to the first end of the storage capacitor circuit and the primary winding; a first end of the storage capacitor circuit is connected to the first end of the primary winding, and a second end thereof is connected to a negative output of the bridge rectifier; and a first end of the switch is connected to the second end of the primary winding, and a second end thereof is connected to the negative output of the bridge rectifier.

In certain classes of this embodiment, the valley-fill capacitor circuit comprises a first capacitor, a second capacitor, a first diode, a second diode and a third diode.

In certain classes of this embodiment, the first diode has an anode being connected to a negative end of the first capacitor and a cathode being coupled to a positive end of the second capacitor; the second diode has an anode being connected to the positive end of the second capacitor and a cathode being coupled to a positive end of the first capacitor; and the third diode has an anode being connected to a negative end of the second capacitor, and a cathode being coupled to the negative end of the first capacitor.

In certain classes of this embodiment, the transformer is a forward transformer or a fly-back transformer.

In certain classes of this embodiment, the transformer transfers energy to the secondary circuit via the secondary winding and stores energy as the transformer is the forward transformer and the switch is turned on; the fly-back winding and the bridge rectifier recharges for the storage capacitor circuit via the fly-back diode as the transformer is the forward transformer and the switch is turned off; the transformer stores energy as the transformer is the fly-back transformer and the switch is turned on; and the fly-back winding and the bridge rectifier recharges for the storage capacitor circuit via the fly-back diode as the transformer is the fly-back transformer and the switch is turned off.

In accordance with a further aspect of the present invention, there is provided a power factor correction (PFC) power supply, comprising: a bridge rectifier having an input and an output, a filter capacitor connected to the output of the bridge rectifier, a transformer having a primary winding and a secondary winding, a forward diode, a fly-back diode, a storage capacitor circuit having a valley-fill circuit and a capacitor connected in parallel, a first switch connected between the primary winding and the storage capacitor circuit, and a second switch connected between the primary winding and the bridge rectifier; wherein an anode of the forward diode is connected to a positive output of the bridge rectifier, and a cathode thereof is connected to a first end of the primary winding; an anode of the fly-back diode is connected to a second end of the primary winding, and a cathode thereof is connected to a first end of the storage capacitor circuit; a first end of the storage capacitor circuit is connected to the first end of the primary winding, and a second end thereof is connected to a negative output of the bridge rectifier; a first end of the first switch is connected to the first end of the primary winding, and a second end thereof is connected to the first end of the capacitor storage circuit; and a first end of the second switch is connected to a second end of the primary winding, and a second end thereof is connected to the negative output of the bridge rectifier.

In certain classes of this embodiment, the valley-fill capacitor circuit comprises a first capacitor, a second capacitor, a first diode, a second diode and a third diode.

In certain classes of this embodiment, the first diode has an anode being connected to a negative end of the first capacitor and a cathode being connected to a negative end of the second capacitor; the second diode has an anode being connected to the negative end of the second capacitor, and a cathode being coupled to a positive end of the first capacitor; and the third diode has an anode being connected to the positive end of the first capacitor, and a cathode being coupled to the positive end of the second capacitor.

In certain classes of this embodiment, the transformer is a forward transformer or a fly-back transformer.

In certain classes of this embodiment, the transformer transfers energy to the secondary circuit via the secondary winding and stores energy as the transformer is the forward transformer and the first switch and the second switch are turned on; the primary winding recharges for the storage capacitor circuit via the fly-back diode as the transformer is the forward transformer and the first switch and the second switch are turned off; the transformer stores energy as the transformer is the fly-back transformer and the first switch and the second switch are turned on; and the transformer transfers energy to the secondary circuit as the transformer is the fly-back transformer and the first switch and the second switch are turned off.

When a voltage across the bridge rectifier exceeds a voltage across the storage capacitor circuit, the voltage of the bridge rectifier is applied to the primary winding. At this time the voltage across the bridge rectifier can be regarded to be transferred to the secondary circuit directly without the storage capacitor circuit, therefore time spent on processing energy is reduced, and an efficiency of the PFC converter is improved.

BRIEF DISCRIPTION OF THE DRAWINGS

DETAILED DESCRIPTION OF THE INVENTION

Figure 1:
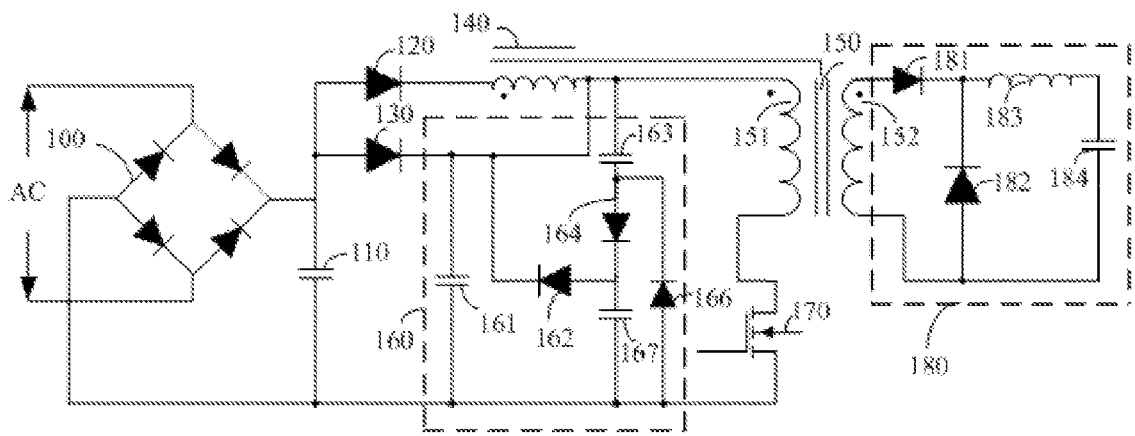
FIG. 1 illustrates a schematic diagram of a power factor correction power supply with a switch.

As shown in FIG. 1, a power factor correction (PFC) power supply of the invention comprises a bridge rectifier 100, a filter capacitor 110, a fly-back diode 120, a forward diode 130, a transformer 150, a storage capacitor circuit 160, and a secondary circuit 180.

The transformer 150 comprises a fly-back winding 140, a primary winding 151 and a secondary winding 152. The primary winding 151 comprises a first end being connected to a cathode of the forward diode 130, and a second end being connected to a first end of the switch 170. The secondary winding 152 is coupled to the secondary circuit 180.

The bridge rectifier 100 has an input and an output respectively being connected to input lines and the filter capacitor 110, so as to rectify an alternating current (AC) line voltage to an input voltage.

The forward diode 130 has an anode being connected to a positive output of the bridge rectifier 100 and a cathode being connected to a first end of the storage capacitor circuit 160 and the primary winding 151.

The filter capacitor 110 is connected to an output of the bridge rectifier 100.

The fly-back diode 120 has an anode being connected to a positive output of the bridge rectifier 100 and a cathode being connected to a first end of the fly-back winding 140.

The fly-back winding 140 magnetically coupled to the transformer 160 has a first end being connected to a cathode of the fly-back diode 120 and a second end being connected to the first end of the storage capacitor circuit 160 and the primary winding 151.

The storage capacitor circuit 160 comprises a valley-fill capacitor circuit and a capacitor 161 connected in parallel. The valley-fill capacitor circuit comprises a plurality of capacitors 163, 167 and diodes 162, 164, 166.

The storage capacitor circuit 160 comprises a first end being connected to a first end of the primary winding 151 of the transformer 150, and a second end being connected to a negative output of the bridge rectifier 100.

The first diode 164 has an anode being connected to a negative end of the first capacitor 163, and a cathode being connected to a positive end of the second capacitor 167.

The second diode 162 has an anode being connected to the positive end of the second capacitor 167, and a cathode being coupled to the positive end of the first capacitor 163.

The third diode 166 has an anode being connected to the negative end of the second capacitor 167, and a cathode being connected to the negative end of the first capacitor 163.

The positive end of the first capacitor 163 is the first end of the storage capacitor circuit 160, and the negative end of the second capacitor 167 is the second end of the storage capacitor circuit 160.

The switch 170 comprises a first end being connected to a second end of the primary winding 151 of the transformer 150, and a second end being connected to a negative output of the bridge rectifier 100.

The secondary circuit 180 comprises a plurality of diodes 181, 182, an inductor 183, and a capacitor 184.

The operation of the PFC power supply is as follows: when the transformer 150 is a forward transformer, as the switch 170 is turned on, the transformer 150 transfers energy to the secondary circuit 180 via the secondary winding 152 and stores energy; as the switch 170 is turned off, the fly-back winding 140 and the bridge rectifier 100 recharges for the storage capacitor circuit 160 via the fly-back diode 120. At this time, the voltage across the storage capacitor circuit 160 is controlled by a leakage inductance of the transformer 150.

When the transformer 150 is a fly-back transformer, as the switch 170 is turned on, the transformer 150 stores energy, as the switch 170 is turned off, the transformer 150 transfer energy to the secondary circuit 180 via the secondary winding 152, and the fly-back winding 140 and the bridge rectifier 100 recharges for the storage capacitor circuit 160 via the fly-back diode 120. At this time, the voltage across the storage capacitor circuit 160 is controlled by a ratio between the number of windings of the fly-back winding 140 and those of the secondary winding 152.

When a voltage across the bridge rectifier 100 exceeds a voltage across the storage capacitor circuit 160, the voltage of the bridge rectifier 100 is applied to the primary winding 151 via the diode 130. At this time the voltage across the bridge rectifier 100 can be regarded to be transferred to the secondary circuit 180 directly without the storage capacitor circuit 160, therefore time spent on processing energy is reduced, and an efficiency of the PFC converter is improved.

To prevent output noise, it is better to have a radio between the voltage across the storage capacitor circuit and a line peak voltage thereof to be above 0.7.

Figure 2:
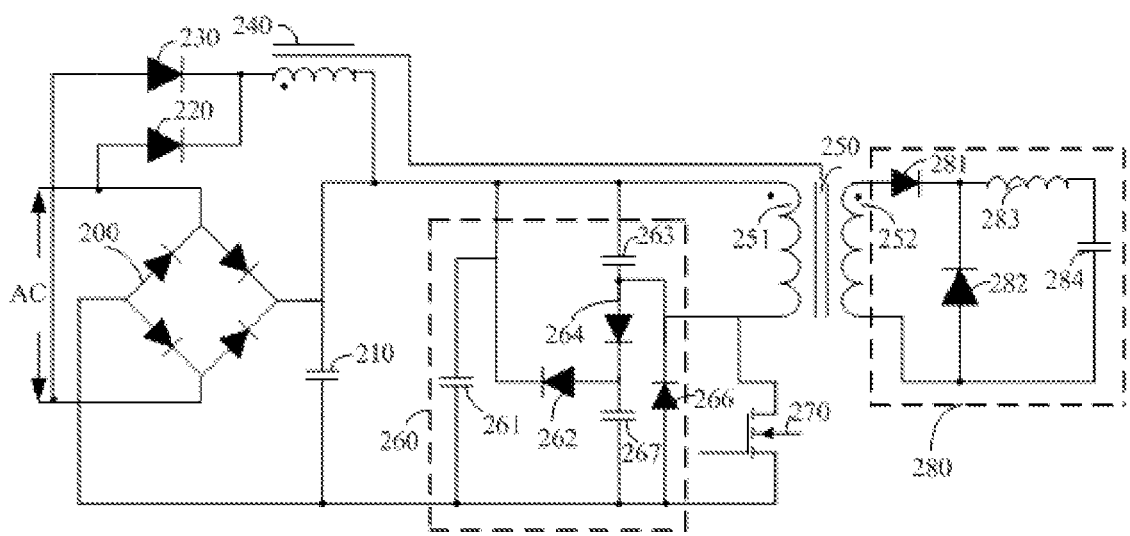
FIG. 2 illustrates a schematic illustrative of another power factor correction power supply with a switch.

Refer now to FIG. 2, a power factor correction (PFC) power supply of the invention comprises a bridge rectifier 200, a filter capacitor 210, a plurality of fly-back diodes 220 and 230, a transformer 250, a storage capacitor circuit 260, and a secondary circuit 280.

The transformer 250 comprises a fly-back winding 240, a primary winding 251 and a secondary winding 252. The primary winding 251 comprises a first end being connected to a cathode of the forward diodes 220 and 230, and a second end being connected to a first end of the switch 270. The secondary winding 252 is coupled to the secondary circuit 280.

The bridge rectifier 200 has an input and an output respectively being connected to input lines and the filter capacitor 210, so as to rectify an AC line voltage to an input voltage.

Each of the forward diodes 220 and 230 has an anode being connected to a positive output of the bridge rectifier 200 and a cathode being connected to a first end of storage capacitor circuit 260 and the primary winding 251.

The filter capacitor 210 is connected to an output of the bridge rectifier 200.

The fly-back diode 220 has an anode being connected to a positive output of the bridge rectifier 200 and a cathode being connected to a first end of the fly-back winding 240.

The fly-back winding 240 magnetically coupled to the transformer 260 has a first end being connected to a cathode of the fly-back diode 220 and a second end being connected to the first end of the storage capacitor circuit 260 and the primary winding 251.

The storage capacitor circuit 260 comprises a valley-fill capacitor circuit and a capacitor 261 connected in parallel.

The valley-fill capacitor circuit comprises a plurality of capacitors 263, 267 and diodes 262, 264, 266.

The storage capacitor circuit 260 comprises a first end being connected to a first end of the primary winding 251 of the transformer 250, and a second end being connected to a negative output of the bridge rectifier 200.

The first diode 264 has an anode being connected to a negative end of the first capacitor 263, and a cathode being connected to a positive end of the second capacitor 267.

The second diode 262 has an anode being connected to the positive end of the second capacitor 267, and a cathode being coupled to the positive end of the first capacitor 263.

The third diode 266 has an anode being connected to the negative end of the second capacitor 267, and a cathode being connected to the negative end of the first capacitor 263.

The positive end of the first capacitor 263 is the first end of the storage capacitor circuit 260, and the negative end of the second capacitor 267 is the second end of the storage capacitor circuit 260.

The switch 270 comprises a first end being connected to a second end of the primary winding 251 of the transformer 250, and a second end being connected to a negative output of the bridge rectifier 200.

The secondary circuit 280 comprises a plurality of diodes 281, 282, an inductor 283, and a capacitor 284.

The operation of the PFC power supply in FIG. 2 is the same as that in FIG. 1, and will not be described in detail herein.

Figure 3:
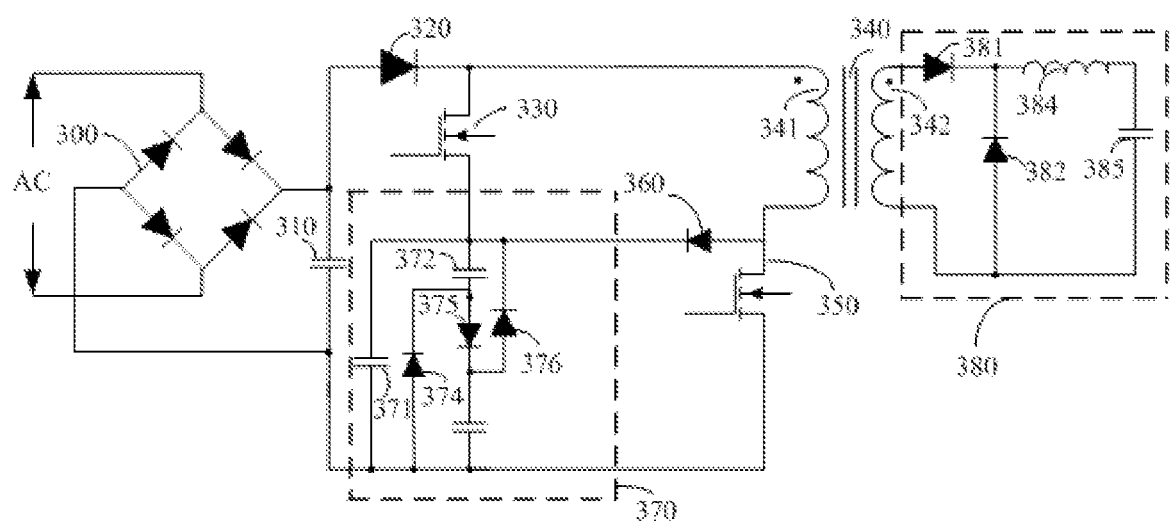
FIG. 3 illustrates a schematic diagram of a power factor correction power supply with two switches.

Refer now to FIG. 3, a power factor correction (PFC) power supply of the invention comprises a bridge rectifier 300, a filter capacitor 310, a forward diode 320, a first switch 330, a transformer 340, a second switch 350, a fly-back diode 360, a storage capacitor circuit 370, and a secondary circuit 380.

The transformer 340 comprises a primary winding 341 and a secondary winding 342. The primary winding 341 comprises a first end being connected to a cathode of the forward diode 320, and a second end being connected to a first end of the second switch 350. The secondary winding 342 is coupled to the secondary circuit 380.

The bridge rectifier 300 has an input and an output respectively being connected to input lines and the filter capacitor 310, so as to rectify an AC line voltage to an input voltage.

The filter capacitor 310 is connected to an output of the bridge rectifier 300.

The forward diode 320 has an anode being connected to a positive output of the bridge rectifier 300 and a cathode being connected to the first end of the primary winding 341

The first switch 330 has a first end being connected to the first end of the primary winding 341, and a second end being connected to the first end of the capacitor storage circuit 370.

The second switch 350 has a first end being connected to a second end of the primary winding 341, and a second end being connected to the negative output of the bridge rectifier 300.

The fly-back diode 360 has an anode being connected to the second end of the primary winding 341, and a cathode being connected to the first end of the storage capacitor circuit 370.

The storage capacitor circuit 370 comprises a valley-fill capacitor circuit and a capacitor 371 connected in parallel. The valley-fill capacitor circuit comprises a plurality of capacitors 372, 373 and diodes 374, 375, 376.

The storage capacitor circuit 370 comprises a first end being connected to a first end of the primary winding 341 of the transformer 340, and a second end being connected to a negative output of the bridge rectifier 300.

The operation of the PFC power supply in FIG. 3 is as follows: when the transformer 340 is a forward transformer, as the first switch 330 and the second switch 350 are turned on, the transformer 340 transfers energy to the secondary circuit 380 via the secondary winding 342 and stores energy; as the first switch 330 and the second switch 350 are turned off, the primary winding 341 recharges for the storage capacitor circuit 370 via the forward diode 320, the fly-back diode 360 and the primary winding 341. At this time, the voltage across the storage capacitor circuit 370 is controlled by a leakage inductance of the transformer 340.

When the transformer 340 is a fly-back transformer, as the first switch 330 and the second switch 350 are turned on, the transformer 340 stores energy, as the first switch 330 and the second switch 350 are turned off, the transformer 340 transfer energy to the secondary circuit 380.

When a voltage across the bridge rectifier 300 exceeds a voltage across the storage capacitor circuit 370, the voltage of the bridge rectifier 300 is applied to the primary winding 341 via the forward diode 320. At this time the voltage across the bridge rectifier 300 can be regarded to be transferred to the secondary circuit 380 directly without the storage capacitor circuit 370, therefore time spent on processing energy is reduced, and an efficiency of the PFC converter is improved.

It should be noted that the forward diode 320 and the filter capacitor 310 are used to reduce a power loss due to a low speed of the bridge rectifier 300, if the bridge rectifier 300 is a fast recovery diode, the forward diode 320 and the filter capacitor 310 may be omitted.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A power factor correction (PFC) power supply, comprising:
    a bridge rectifier having an input and an output;
    a filter capacitor connected to the output of the bridge rectifier;
    a transformer having a primary winding, a fly-back winding and a secondary winding;
    a forward diode;
    a fly-back diode;
    a storage capacitor circuit having a valley-fill circuit and a capacitor connected in parallel; and
    a switch connected between the primary winding and the output of the bridge rectifier;
    wherein
    an anode of the forward diode is connected to a positive output of the bridge rectifier, and a cathode thereof is connected to a first end of the storage capacitor circuit and the primary winding;
    an anode of the fly-back diode is connected to the positive output of the bridge rectifier, and a cathode thereof is connected to a first end of the fly-back winding;
    a second end of the fly-back winding is connected to the first end of the storage capacitor circuit and the primary winding;
    a first end of the storage capacitor circuit is connected to the first end of the primary winding, and a second end thereof is connected to a negative output of the bridge rectifier; and
    a first end of the switch is connected to the second end of the primary winding, and a second end thereof is connected to the negative output of the bridge rectifier.

2. The PFC power supply of claim 1, wherein the valley-fill capacitor circuit comprises a first capacitor, a second capacitor, a first diode, a second diode and a third diode.

3. The PFC power supply of claim 2, wherein
    the first diode has an anode being connected to a negative end of the first capacitor and a cathode being coupled to a positive end of the second capacitor;
    the second diode has an anode being connected to the positive end of the second capacitor, and a cathode being coupled to a positive end of the first capacitor; and
    the third diode has an anode being connected to a negative end of the second capacitor, and a cathode being coupled to the negative end of the first capacitor.

4. The PFC power supply of claim 1, wherein the transformer is a forward transformer or a fly-back transformer.

5. The PFC power supply of claim 4, wherein
    the transformer transfers energy to the secondary circuit via the secondary winding and stores energy as the transformer is the forward transformer and the switch is turned on;
    the fly-back winding and the bridge rectifier recharges for the storage capacitor circuit via the fly-back diode as the transformer is the forward transformer and the switch is turned off;
    the transformer stores energy as the transformer is the fly-back transformer and the switch is turned on; and
    the fly-back winding and the bridge rectifier recharges for the storage capacitor circuit via the fly-back diode as the transformer is the fly-back transformer and the switch is turned off.

6. A power factor correction (PFC) power supply, comprising:
    a bridge rectifier having an input and an output;
    a filter capacitor connected to the output of the bridge rectifier;
    a transformer having a primary winding, a fly-back winding and a secondary winding;
    a first fly-back diode;
    a second fly-back diode;
    a storage capacitor circuit having a valley-fill circuit and a capacitor connected in parallel; and
    a switch connected between the primary winding and the output of the bridge rectifier;
    wherein
    an anode of each of the first fly-back diode and the second fly-back diode is connected to a positive output of the bridge rectifier, and a cathode thereof is connected to a first end of the storage capacitor circuit and the primary winding;
    a second end of the fly-back winding is connected to the first end of the storage capacitor circuit and the primary winding;
    a first end of the storage capacitor circuit is connected to the first end of the primary winding, and a second end thereof is connected to a negative output of the bridge rectifier; and
    a first end of the switch is connected to the second end of the primary winding, and a second end thereof is connected to the negative output of the bridge rectifier.

7. The PFC power supply of claim 6, wherein the valley-fill capacitor circuit comprises a first capacitor, a second capacitor, a first diode, a second diode and a third diode.

8. The PFC power supply of claim 7, wherein
the first diode has an anode being connected to a negative end of the first capacitor and a cathode being coupled to a positive end of the second capacitor;
the second diode has an anode being connected to the positive end of the second capacitor, and a cathode being coupled to a positive end of the first capacitor; and
the third diode has an anode being connected to a negative end of the second capacitor, and a cathode being coupled to the negative end of the first capacitor.

9. The PFC power supply of claim 6, wherein the transformer is a forward transformer or a fly-back transformer.

10. The PFC power supply of claim 9, wherein
the transformer transfers energy to the secondary circuit via the secondary winding and stores energy as the transformer is the forward transformer and the switch is turned on;
the fly-back winding and the bridge rectifier recharges for the storage capacitor circuit via the fly-back diode as the transformer is the forward transformer and the switch is turned off;
the transformer stores energy as the transformer is the fly-back transformer and the switch is turned on; and
the fly-back winding and the bridge rectifier recharges for the storage capacitor circuit via the fly-back diode as the transformer is the fly-back transformer and the switch is turned off.

11. A power factor correction (PFC) power supply, comprising:
a bridge rectifier having an input and an output;
a filter capacitor connected to the output of the bridge rectifier;
a transformer having a primary winding and a secondary winding;
a forward diode;
a fly-back diode;
a storage capacitor circuit having a valley-fill circuit and a capacitor connected in parallel;
a first switch connected between the primary winding and the storage capacitor circuit; and
a second switch connected between the primary winding and the bridge rectifier;
wherein
an anode of the forward diode is connected to a positive output of the bridge rectifier, and a cathode thereof is connected to a first end of the primary winding;
an anode of the fly-back diode is connected to a second end of the primary winding, and a cathode thereof is connected to a first end of the storage capacitor circuit;
a first end of the storage capacitor circuit is connected to the first end of the primary winding, and a second end thereof is connected to a negative output of the bridge rectifier;
a first end of the first switch is connected to the first end of the primary winding, and a second end thereof is connected to the first end of the capacitor storage circuit; and
a first end of the second switch is connected to a second end of the primary winding, and a second end thereof is connected to the negative output of the bridge rectifier.

12. The PFC power supply of claim 11, wherein the valley-fill capacitor circuit comprises a first capacitor, a second capacitor, a first diode, a second diode and a third diode.

13. The PFC power supply of claim 12, wherein
the first diode has an anode being connected to a negative end of the first capacitor and a cathode being connected to a negative end of the second capacitor;
the second diode has an anode being connected to the negative end of the second capacitor, and a cathode being coupled to a positive end of the first capacitor; and
the third diode has an anode being connected to the positive end of the first capacitor, and a cathode being coupled to the positive end of the second capacitor.

14. The PFC power supply of claim 11, wherein the transformer is a forward transformer or a fly-back transformer.

15. The PFC power supply of claim 14, wherein
the transformer transfers energy to the secondary circuit via the secondary winding and stores energy as the transformer is the forward transformer and the first switch and the second switch are turned on;
the primary winding recharges for the storage capacitor circuit via the fly-back diode as the transformer is the forward transformer and the first switch and the second switch are turned off;
the transformer stores energy as the transformer is the fly-back transformer and the first switch and the second switch are turned on; and
the transformer transfers energy to the secondary circuit as the transformer is the fly-back transformer and the first switch and the second switch are turned off.

* * * * *